(12) United States Patent  
Lowry et al.

(10) Patent No.: US 6,941,560 B1  
(45) Date of Patent: Sep. 6, 2005

(54) XML-BASED INTEGRATED SERVICES EVENT SYSTEM

(75) Inventors: Dale Lowry, Springville, UT (US); Samuel F. Fletcher, Orem, UT (US); Craig C. Johnson, Cedar Hills, UT (US); Kent Sievers, Orem, UT (US)

(73) Assignee: Novell, Inc., Provo, UT (US)

( * ) Notice: Subject to any disclaimer, the term of this patent is extended or adjusted under 35 U.S.C. 154(b) by 451 days.

(21) Appl. No.: 09/865,257

(22) Filed: May 25, 2001

Related U.S. Application Data

(63) Continuation of application No. 09/832,970, filed on Apr. 11, 2001, now abandoned, which is a continuation of application No. 09/741,678, filed on Dec. 19, 2000, now abandoned.

(51) Int. Cl.[7] ............................................. G06F 3/00
(52) U.S. Cl. ...................... 719/328; 719/315; 719/316; 719/317; 719/318; 709/201; 709/203; 709/223; 709/224; 709/227; 709/228; 709/230; 709/246
(58) Field of Search ............................... 709/310, 201, 709/203, 223, 224, 227, 228, 230, 246; 719/315, 719/316, 317, 318, 328

(56) References Cited

U.S. PATENT DOCUMENTS

| | | | |
|---|---|---|---|
| 5,692,129 A | 11/1997 | Sonderegger et al. | |
| 5,761,499 A | 6/1998 | Sonderegger | |
| 5,828,882 A | 10/1998 | Hinckley | |
| 5,893,118 A | 4/1999 | Sonderegger | |
| 5,903,720 A | 5/1999 | Stokes | |
| 5,925,108 A | 7/1999 | Johnson et al. | |
| 6,061,740 A | 5/2000 | Ferguson et al. | |
| 6,081,774 A | 6/2000 | de Hita et al. | |
| 6,081,804 A | 6/2000 | Smith | |
| 6,125,391 A * | 9/2000 | Meltzer et al. | 709/223 |
| 6,167,448 A * | 12/2000 | Hemphill et al. | 709/224 |
| 6,173,289 B1 | 1/2001 | Sonderegger et al. | |
| 6,263,376 B1 | 7/2001 | Hatch et al. | |
| 6,286,010 B1 | 9/2001 | Ramachandran et al. | |
| 6,643,650 B1 * | 11/2003 | Slaughter et al. | 707/10 |
| 2003/0069874 A1 * | 4/2003 | Hertzog et al. | 707/1 |

* cited by examiner

Primary Examiner—Nabil El-Hady  
(74) Attorney, Agent, or Firm—Haynes and Boone, LLP

(57) ABSTRACT

An improved system, method and software program is provided for distributed directory enabled applications using an XML API. The improvement provides an event system, a parser, and a bridge-based object model. The event system includes the ability to publish an event, subscribe to the event, and act on the event. The parser enables the XML API to parse XML files by accepting an XML file as an input stream, parsing the input stream, dynamically loading system services referenced in the input stream, and configuring the services. The bridge-based object model utilizes thread safeness, which enables a bridge to use semaphore access control to control thread access, smart pointers, which enable a bridge to automatically manage the memory it requires, and opaque interfaces, which allow a bridge to maintain interface compatibility when implementation changes occur in an interface.

21 Claims, 6 Drawing Sheets

XML-BASED INTEGRATED SERVICES EVENT SYSTEM

CROSS REFERENCE

This application is a Continuation of U.S. Ser. No. 09/832,970, filed Apr. 11, 2001, now abandoned, which is a Continuation of U.S. Ser. No. 09/741,678, filed Dec. 19, 2000, now abandoned. This application is related to U.S. patent application Ser. No. 09/878,710, filed on Jun. 11, 2001, and entitled "XML-BASED INTEGRATED SERVICES BRIDGING,", now U.S. Pat. No. 6,772,206, issued Aug. 3, 2004, and is also related to U.S. patent application Ser. No. 09/865,232, filed on May 25, 2001 and entitled "XML-BASED INTEGRATED SERVICES PARSING."

BACKGROUND

This invention relates generally to computer software and, more specifically, to a system and method for providing distributed, directory-enabled applications using an eXtensible Markup Language ("XML") application program interface ("API") framework.

Personal computers or workstations may be linked in a computer network to facilitate the sharing of data, applications, files, and other resources. One common type of computer network is a client/server network, where some computers act as servers and others as clients. In a client/server network, the sharing of resources is accomplished through the use of one or more servers. Each server includes a processing unit that is dedicated to managing centralized resources and to sharing these resources with other servers and/or various personal computers and workstations, which are known as the "clients" of the server.

Different software applications are available through the server to the clients as network resources. The clients may also utilize "standalone" applications, which may be installed only on a client and not available through the network. The applications may perform a variety of tasks, such as word processing, email, web browsing, and many more. The applications may be written in a variety of programming languages as long as the applications are compiled to function on the underlying operating systems used by the server and the clients.

Each application is constructed using a native API that provides a set of routines, protocols, and tools. This set provides the building blocks that allow programmers to enable the applications which use the API to communicate with the operating system and other programs. Large applications such as operating systems may have hundreds of API calls to provide other applications the interfaces needed for effective communication and access to the operating system's services. Smaller applications may have a very limited set of API calls.

Because APIs are constructed for a specific application in a given programming language and targeted at a particular platform or operating system, they generally cannot be used as an interface for another application without making nontrivial modifications. In addition, such highly specific APIs make it difficult for applications to communicate if, for example, the applications were written using different programming languages or for use on different operating systems.

It is desired to provide an XML integrated services ("XIS") framework utilizing a flexible, cross-protocol, cross-language API for distributed directory-enabled applications by providing both a high level of interactivity and modular dynamic components with a common object model for both clients and servers.

SUMMARY

In response to these and other problems, an improved system and method is provided for an event system in a distributed directory-enabled environment using an eXtensible Markup Language ("XML") application program interface. The interface includes at least one event delineated by an event parameter, where the event defines an object delineated by an object property and an object parameter.

The method defines at least one subscription filter which allows a subscriber to selectively filter the event. The event is published and a subscriber list is retrieved which includes a subscriber and the filter. The subscriber and the filter are selected from the list and the event is filtered through the filter. Subscription to the event occurs if the event passes through the filter and the subscriber may perform actions on the event after subscription.

DESCRIPTION OF THE EMBODIMENT

The present invention provides a unique system and method that utilizes an XIS API framework for developing distributed, directory-enabled applications. The framework uses modular dynamic components and provides a high level of interactivity with a common object model for both clients and servers. It is understood that the following disclosure provides many different embodiments, or examples, for implementing different features. Specific examples of networks, components, and formats are described below to simplify the present disclosure. These are, of course, merely examples and are not intended to limit the invention from that described in the claims. In order to simplify the following description, an exemplary system is first described and then each subsystem is described in further detail.

Exemplary System

Figure 1:
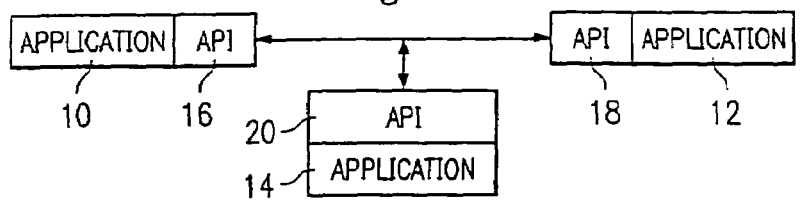
FIG. 1 illustrates the interaction of three applications through their respective APIs.

Referring to FIG. 1, in one embodiment an application 10 may communicate with another application 12 and an operating system application 14. Communication between the applications 10 and 12 may occur directly or the operating system 14 may require any communication to occur indirectly through the operating system 14 for security purposes. To accomplish this communication, each of the applications 10, 12 and 14 utilizes an API 16, 18 and 20, respectively.

Each of the APIs 16, 18 and 20 may contain multiple method or function calls. The operating system API 20 may contain hundreds of API calls due to its complexity, while the APIs 16 and 18 of the applications 10 and 12 may contain a very limited number of calls depending on the functionality of each application. The APIs 16 and 18 are ordinarily written to enable the applications 10 and 12 to communicate with the specific operating system 14. In addition, the APIs for applications 10 and 12 may each necessarily contain limitations in the programming languages they support and their overall capabilities due to is es such as development budget constraints and target machine specifications.

Target machine specifications may include basic minimum system requirements such as allowable application size in memory, minimum system speed in terms of clock cycles per second, minimum video card requirements, operating system type, and any other system specification required to install and use the particular application. Such limitations make it extremely difficult to write a comprehensive API for each individual application which is able to communicate effectively with APIs for other applications written in different languages or for different operating systems.

In an example of such API-based communication, the application 10 may be the email application GroupWise by Novell Incorporated of Provo, Utah, the application 12 may be the word processing application WordPerfect by Corel Corporation of Ottawa, Canada, and the operating system application 14 may be Windows 95/98/NT by Microsoft Corporation of Redmond, Wash. The email application GroupWise 10 receives an email message that contains an attached file in the proprietary WordPerfect format. GroupWise 10 is unable to open the file itself, and so notifies the operating system Windows 14 that a file in the WordPerfect format needs to be opened. The communication from GroupWise 10 to Windows 14 is in the form of a series of API calls requesting the service that handles the WordPerfect format. Windows 14 relates this service to the word processing application WordPerfect 12, and calls WordPerfect 12 to open the file. Again, the communication is in the form of a series of API calls. WordPerfect 12 then opens the file. The APIs of the different applications allow this interaction to occur by providing interfaces to their respective functions.

Figure 2:
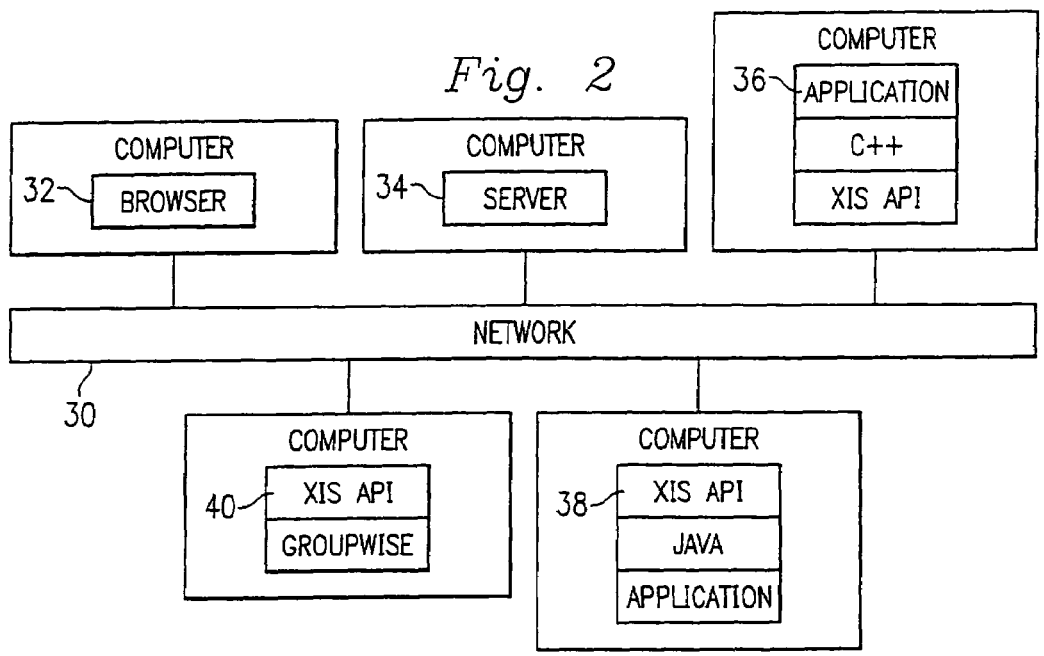
FIG. 2 is a simple system illustrating a possible implementation of an XIS API framework.

Referring now to FIG. 2, a system using an XIS API framework is shown. A network 30, which may be a local area network ("LAN"), a wide area network ("WAN"), the Internet, or any other type of network, wireless or otherwise, forms the basis of the communication channels between a variety of applications. Connected to the network 30 are multiple computers, which may be personal computers, workstations, servers, personal digital assistants, cell phones, or any other device capable of connecting to a network. The computers operate various common viewing and data delivery objects such as a browser 32 and a server 34. Also shown is an application 36 written in C++ and an application 38 written in Java. A third application 40 is also connected to the network 30. Connections from the applications 32, 34, 36, 38 and 40 to the network 30 may use a variety of protocols, such as the HyperText Transfer Protocol ("HTTP"), the Asynchronous Transfer Mode ("ATM") protocol, or any other protocol used for network communications. In addition, the applications 32, 34, 36, 38 and 40 need not use the same protocol, but may use any combination of protocols to access the network 30.

However, the various applications 32, 34, 36, 38 and 40 cannot necessarily communicate due to API differences such as the language or protocol differences previously described. To remedy this incompatibility, an XIS API framework is implemented to provide communication capabilities between the applications.

Figure 3:
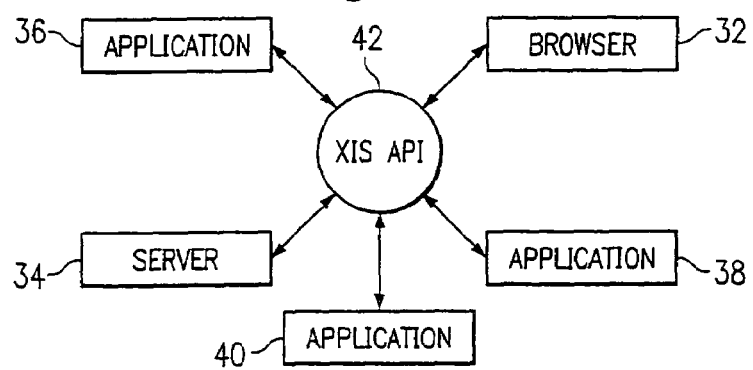
FIG. 3 is a diagram illustrating one embodiment of an XIS API providing interaction between various applications.

Referring now to FIG. 3, an XIS API 42 forms a virtual communications "hub" between various applications, such as the applications 32, 34, 36, 38 and 40 of FIG. 2. Although FIG. 3 shows the XIS API 42 located at a single location for purposes of illustration, various components of the XIS API 42 may be distributed across a network such as the network 30 of FIG. 2. The XIS API 42 serves as an intermediary between the actual APIs of the applications 32, 34, 36, 38 and 40, providing a secondary API layer which makes "calls" in the distributed network environment. This allows the applications 32, 34, 36, 38 and 40 to use their native APIs but still communicate with each other through the XIS API 42 framework, regardless of language or protocol differences between their original APIs. The XIS API 42 framework accomplishes its objectives as a communications facilitator between the various applications 32, 34, 36, 38 and 40 through the use of a number of integrated components which are described in more detail below.

Figure 4:
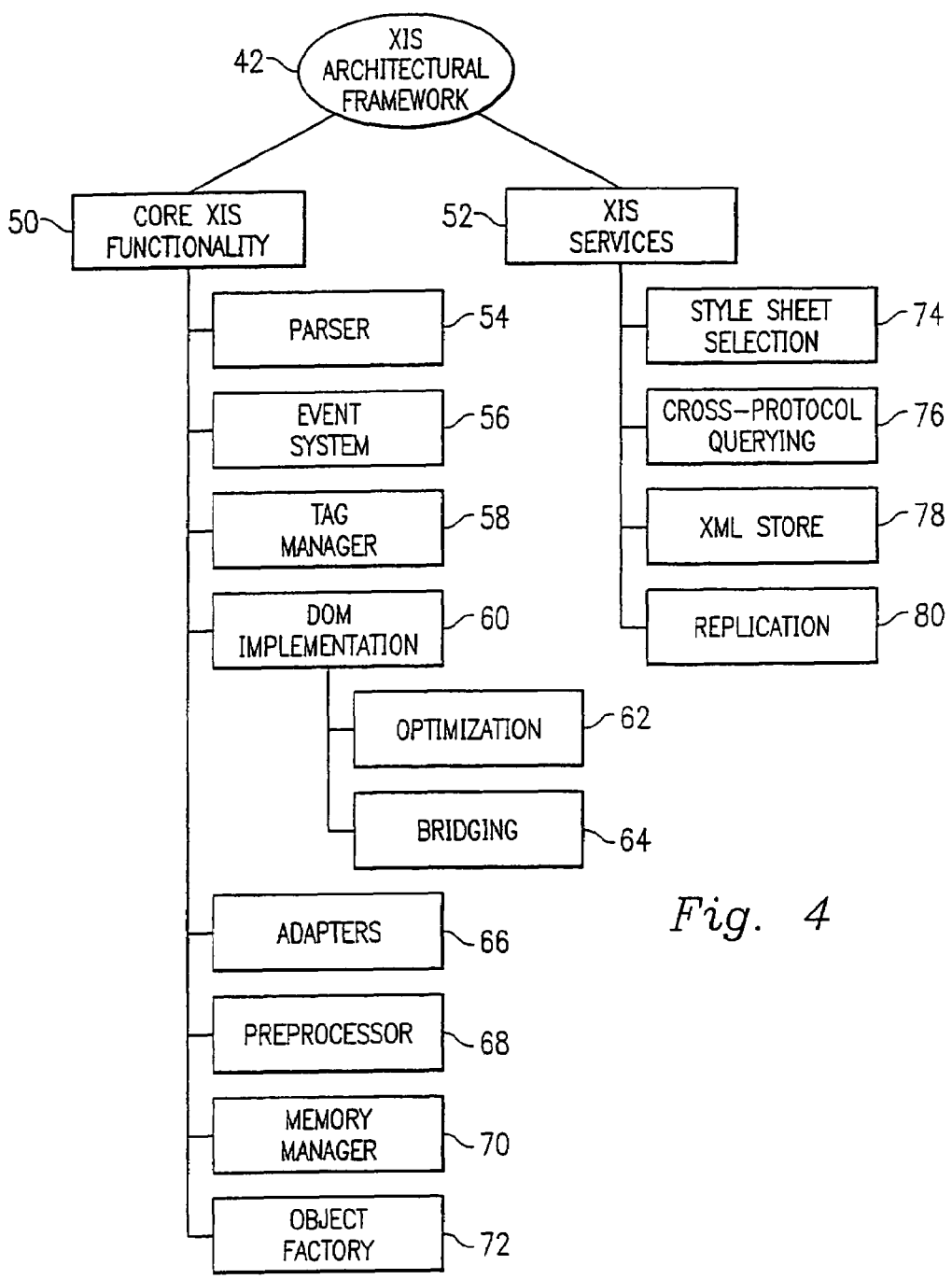
FIG. 4 is an exemplary illustration of an XIS architectural framework.

FIG. 4 illustrates one embodiment of an XIS architectural framework 42, such as the XIS API 42 of FIG. 3. The XIS architectural framework 42 is comprised of core XIS-functionality 50, and a number of XIS services 52. The XIS core functionality 50 includes an XML parser 54, an event system 56, a tag manager 58, a document object model ("DOM") implementation 60 which includes optimization techniques 62 and bridging technology 64, adapters 66, a preprocessor 68, a memory manager 70, and an object factory 72 which enables various caching techniques. The XIS services 52 provide style sheet selection methods 74 which include algorithms and rendering, a means for cross-protocol querying 76, an XML store 78, and replication techniques 80. Each of these components is covered below in further detail.

Exemplary System Components

XML Parser

An XML parser is required to analyze an XML document and convert the document into machine recognizable commands, functional units, and information. Many different XML parsers exist and are classified as either non-validating or validating. Non-validating parsers verify that an XML document meets the general rules of XML, such as the requirement that there is only one root element. Validating parsers perform the same verification as non-validating parsers, but also perform more rigorous checks. For example, validating parsers may ensure that the XML document conforms to the rules laid out by its document type definition ("DTD"), as well as use information obtained from the DTD to provide extra capabilities, such as entity substitution and attribute defaulting.

Figure 5:
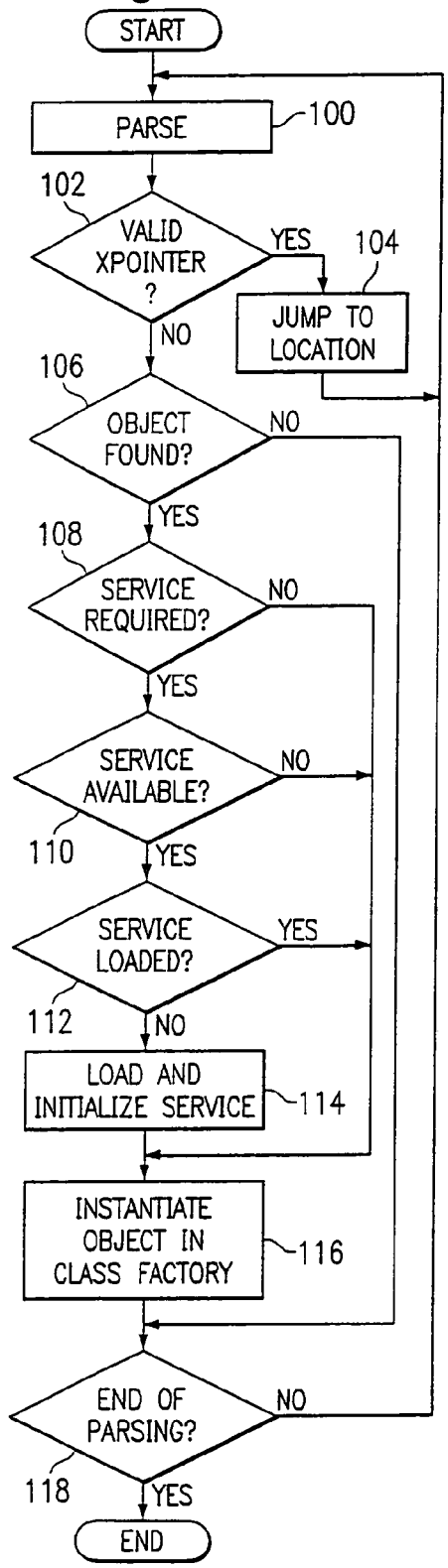
FIG. 5 is a flowchart of a possible parsing sequence for one embodiment of the present invention.

Referring now to FIG. 5, a possible parsing sequence for an XML parser in one embodiment begins to parse an XML document at step 100. While parsing, the parser determines in step 102 whether an Extended Pointer ("XPointer") has been provided for focused parsing purposes. In parsing, the existence of an XPointer identifies the location within a document where parsing is to begin. For example, an XML file may contain a set of nested statements, and a program's initial point of execution within the nested statements depends on a variety of factors which form a unique state. Depending on the particular state, XPointers may be used to direct the program's execution sequence into the nested statements so that unnecessary statements are skipped during execution. If a valid XPointer has been provided, the parser jumps to the location specified by the pointer in step 104 before it returns to step 100 to continue parsing.

If no such pointer was provided, the parser then determines in step 106 whether it has scanned an identifiable object. If it has not, the parser advances to step 118. If the entire file has been parsed, the parsing sequence ends. If more parsing is required, the parser returns to step 100 and continues parsing.

If an object is identified in step 106, the parser determines in step 108 whether the instantiation of the object requires a service to be loaded. For example, the code for instantiating an object may be provided by an email service such as Novell's GroupWise. If no such service is required by the object, the parser instantiates the object in a class factory in step 116.

If a service is required by a newly parsed object, the parser determines whether the service is available in step 110. Availability in this context simply means that the service is present on the system. If, for example, the object requires a service provided by Novell's GroupWise and GroupWise is not installed on the system, the parser would find the service unavailable. If the service is unavailable, the parser instantiates the appropriate standard DOM object or highest available class in step 116.

If the service is available, the parser determines whether the service is already present in memory in step 112. If the service is present in memory, the parser continues to step 116, where the object is instantiated in the class factory. If the service is not present in memory, the parser loads and initializes the service as required by the object in step 114. The parser then proceeds to instantiate the object in the class factory in step 116.

The parser determines in step 118 whether the end of the file has been reached. If further parsing is required, the parser returns to step 100 and continues parsing. If the entire XML document has been parsed, the parser exits.

An advantage of this embodiment is that when an object is instantiated in the class factory, it may default to the appropriate standard DOM object or the highest available class.

Another advantage of this embodiment is that the parser dynamically loads and configures services as they are needed. Therefore, there is no requirement that all possible required services be loaded prior to parsing. This provides multiple benefits. One benefit is more efficient memory and resource usage as unnecessary services are not loaded into memory. Another benefit is more efficient processor utilization, as the processor need not waste time loading unused services or allocating memory.

Event System

Figure 6:
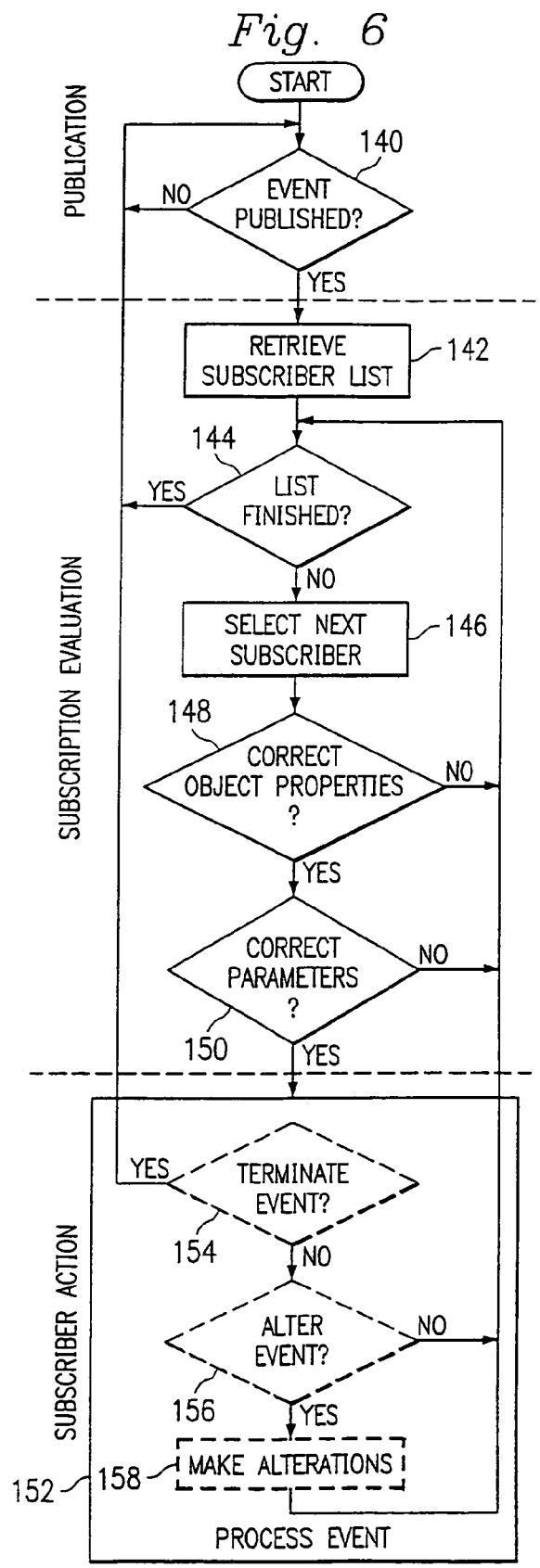
FIG. 6 is a flowchart of an event sequence in an exemplary event system.

Referring now to FIG. 6, in one embodiment, an event system is subdivided for ease of description into the three stages of publication, subscription, and subscriber action. Although this example discusses only a single publication and subscription, there may be multiple subscribers to any event and any subscriber may subscribe to multiple events or all events. Therefore, the event system may be required to handle multiple publications, subscriptions and actions in any order. Subscription occurs before publication. In addition, a subscriber may subscribe to all publications. For clarity, the illustration of FIG. 6 uses a basic event sequence of publication, subscription evaluation and subscriber action occurring in a consecutive fashion.

The event sequence begins with the publication of an event in step 140. Such an event may be any occurrence that can be noted by the system, such as receiving an email message, storing a document, or detecting a change in a database directory structure. For purposes of example, assume that a user saves a new document in a database, which is defined as a system recognizable publication. Therefore, the act of saving the document triggers a system-wide publication that a new document has been saved to the database.

The event flow then moves into the subscription evaluation stage, where any subscriber is able to process the event. Subscribers are typically services, which may include a remote service which uses a Transmission Control Protocol/Internet Protocol ("TCP/IP") connection to send the event to the handling code, a local service (such as a Dynamic Link Library ("DLL"), a NetWare Loadable Module ("NLM"), or a Java class) which provides an event handler call which handles the event, or a Uniform Resource Locator ("URL") where the event is posted. This interaction between supported XIS services through the event system contributes greatly to the underlying flexibility of the XIS framework.

Three different filters may be used to determine whether a subscriber should receive the event in question. Each filter is described briefly before continuing with the flowchart of FIG. 6. The first filter is an event filter, which allows the subscriber to define the events in which the subscriber is interested. Continuing the above example, the event of interest to a downstream subscriber is the publication that a new document has been saved in the database. The second filter is an object filter, which allows the filtering to occur based on the properties of the object defined in the given event. In the above example, the object filter may check such properties as the document's file format. The third filter is a parameter filter, which allows the subscriber to define the filter based on the parameters of the object or event. Again continuing the above example, the filter may examine such object parameters as the user name of the document creator or whether a keyword is present in the title of the document. The three filters may be used individually, not at all, or in any combination to determine whether a given event is one to which the subscriber desires to subscribe. In the example of FIG. 6, it is assumed that all three filters are active and applied in a linear fashion to provide three consecutive levels of filtering.

Continuing with FIG. 6, in step 142 the event system retrieves a list of subscribers which consists of subscribers who have subscribed specifically to the published event, and subscribers who have subscribed to all events. Each subscription includes the filters which apply to that subscription. A loop is created through the ordered subscribers to the event in step 144. If each subscriber on the list has been processed, then the event is complete and control is returned to step 140. If subscribers still remain on the list, the next subscriber is selected from the list in step 146 and the object filter for the current subscriber is evaluated in step 148. If the event is rejected by the filter, the process returns to step 144. If the event is accepted by the filter, the sequence proceeds to the parameter filter in step 150. Again, the filter determines whether the event is rejected, which returns the event sequence to step 144, or accepted, which leads to the final stage where the subscriber may take action regarding the event.

The subscriber receiving the event may take a number of actions which effect the flow of the event sequence. Any action that the subscribed user may take regarding the event is effective system-wide, and so affects downstream users who may receive the event.

In step 152, the subscriber processes the event. For instance, the subscriber can modify the object and/or parameters or can mark the event as handled. These changes could pertain to downstream subscribers. Continuing with the event processing in step 154, the subscriber processing the event has the option of specifying that the event should be terminated. If, in the course of processing the event, the subscriber marks the event as terminated, then the event sequence exits the subscriber loop and returns control to step 140. Downstream subscribers will not receive the terminated event. For example, the user may discover that the object is infected with a virus. To prevent the virus from spreading throughout the system, the user may simply terminate the event. If the subscriber does not terminate the event, the sequence continues to step 156.

Continuing the previous example, the subscriber may choose not to terminate the event but rather correct the event by removing the virus, which changes the object itself as well as the parameters of the event. If the subscriber chooses to alter the event, the alterations are performed in step 158. The user may then pass the event on by returning the sequence to step 144.

In addition to the event sequence of publication, subscription and subscriber action, the event system of the present embodiment allows customized tracking of events within the system. This permits the generation of detailed tracking records and audit trails.

An advantage of this embodiment is that subscribers may be any combination of TCP/IP connections, local services such as DLLs and NLMs, Java classes and URLs. This combination of subscribers provides a highly flexible framework.

Another advantage of this embodiment is that it uses efficient algorithms for publishing events, filtering events and subscribing to events.

Yet another advantage of this embodiment is that any subscriber may subscribe to any and/or all publications.

Still another advantage is that audit trails can be made of the events within the system.

Still another advantage is that supported XIS services may interact with each other through the event system.

Tag Management

The underlying framework of the present embodiment implements its DOM with numeric tags. However, the XIS framework's API set allows API calls to utilize either string or numeric tags. This creates a duality which must be resolved because the DOM will not understand the strings. This duality is resolved by a tag manager.

Figure 7:
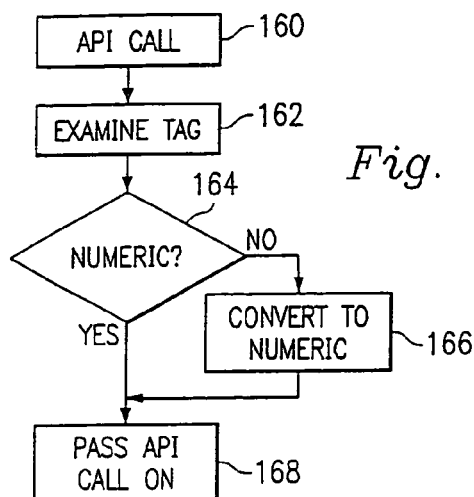
FIG. 7 is a flowchart illustrating a method by which a tag manager may resolve tag duality issues in one embodiment.

Referring now to FIG. 7, the tag manager accomplishes this by first receiving an API call 160. The tag manager then locates and examines the call tag in 162. In 164, the tag manager determines whether the tag is in string or numeric form. If the tag is in string form, the tag manager converts it to the appropriate numeric tag in step 166 before passing it on the API call in 168. If the tag is already in numeric form, the tag manager simply passes it on.

DOM Implementation: Optimization

The DOM for the XIS framework is implemented with numeric tags. As discussed previously, the DOM relies on a tag manager to resolve the ambiguity presented by the duality of interfaces in the API set.

The DOM is optimized through the use of a smashed leaf hierarchy. This optimization technique operates by structuring the DOM to compact a data tree comprising nodes and leafs, where the leafs are nodes at the lowest level of the data tree. The DOM holds the leafs in the nodes at the next to leaf level. When access to a particular leaf is needed, the DOM will dynamically expand the related node and expose the leaf. This provides more efficient memory utilization by reducing the amount of memory needed to store the structure.

DOM Implementation: Bridges

The DOM implementation for the XIS framework uses object bridges to solve various object model problems. An object bridge, such as the bridge described in Gamma, et al., *Design Patterns: Elements, of Reusable Object-Oriented Software*, Addison-Wesley, Reading, Mass. (1995), and hereby incorporated by reference as if reproduced in its entirety, is used to decouple an abstraction from its implementation so that the two can vary independently.

In one embodiment, the predefined bridge structure contains three components which dictate the basic foundational behavior of a bridge regardless of its specific cross-language and/or cross implementation objectives. This predefined structure ensures that each bridge will operate in a robust and effective manner.

Figure 8:
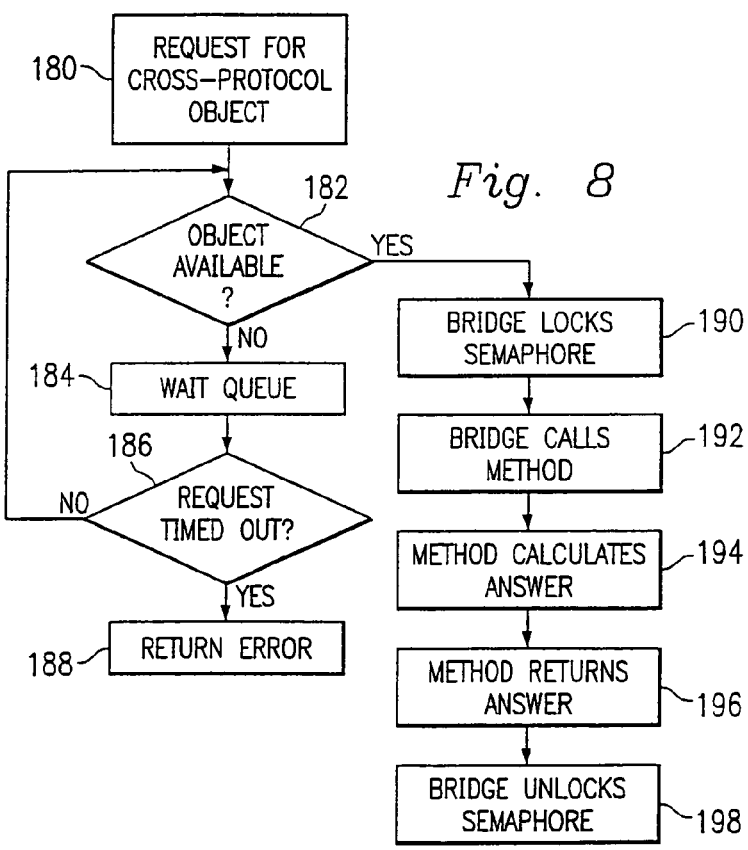
FIG. 8 is a flowchart illustrating an exemplary process for implementing thread safeness through a bridge.

The first component is thread safeness, which ensures that an object will only be accessed by a single thread at a time. When more than one thread simultaneously access an object, methods which modify the object can result in indeterminate results. The DOM implementation in the XIS framework solves this problem by providing semaphored access control generated in the object bridge. For example, referring now to FIG. 8, an arbitrary multi-threaded user's application instantiates an object in step 180 which is made available to multiple threads. The object has a method which, for purposes of this example, returns a time-based numerical answer.

To calculate the answer, the object utilizes a counter which is reset each time method is called. If the method is called by another thread before the first thread's task is complete, the counter will be reset and the first thread may receive an incorrect answer. To prevent this, a semaphore is used to indicate whether the object is currently in use and to prevent access until the object is available again.

The bridge responds to the request for the object by first determining whether the object is currently available in step 182. If the object is not available, the bridge enters a wait queue in step 184. The bridge then checks whether the request has timed out in step 186. If the request has timed out, it returns an error to the application in 188. If the request does not time out first, the bridge returns to step 182 to check the availability of object. Once the bridge obtains access to the object, it locks the semaphore in step 190 to prevent access to the object by any other thread.

The bridge then calls the method on the bridge-to object in step 192. The method performs its calculations in step 194 and returns the numerical answer to the bridge in 196. Finally, in step 198, the bridge releases the object by unlocking the semaphore, which indicates that the object is again available.

The second predefined component of a bridge is the utilization of smart pointers. The smart pointers automatically handle the memory management requirements for the bridge, including memory allocation and deallocation. This reduces the operating system call overhead because the bridge no longer needs to request individual memory operations from the operating system. Additionally, this frees the processor to attend to other tasks and so increases overall system efficiency. In addition, memory is automatically freed when the object goes out of scope, eliminating memory leaks which are difficult to find.

The third predefined component of a bridge is an opaque interface. The bridge allows the implementation to change while still maintaining the interface. The bridge makes whatever modifications are necessary to support the interface even if the implementation changes. For example, suppose a particular object's implementation includes methods which are for internal use only. The bridge's opaque interfacing can prevent access to the internal methods through the exposed object.

In addition, the opaque interfacing means that application developers are able to treat a bridge as a "black box." Therefore, the developers need not be concerned with how the bridges operate, but simply know that a bridge will automatically perform the required cross implementation and/or cross language translations. This greatly increases the speed of the software development cycle and provides developers with an extremely flexible and powerful tool which is still easy to use.

Therefore, bridges contain both predetermined, foundational components which define the: operation of every bridge and dynamically generated parameters which define the particular objectives of each bridge in terms of cross-language and/or cross implementation functionality. The dynamic components are defined in the pre-processor's XML configuration files used to generate the bridges.

An advantage of this embodiment is that bridges are dynamically generated during a preprocessor phase based on an XML configuration file. This allows pre-generation changes to be made in a single file and also provides efficiency benefits as only required bridges are generated.

Another advantage of this embodiment is that the bridges use XML to provide both cross implementation and cross-language bridging.

Another advantage of this embodiment is that it automatically ensures thread safeness.

Yet another advantage of this embodiment is that it automatically handles memory management issues through the use of smart pointers.

Still another advantage of this embodiment is that it provides an opaque interface which provides the user with full functionality while hiding implementation methods.

Adapters

Adapters allow communication to occur between applications and/or objects that otherwise are not compatible and cannot communicate directly. Such incompatibility may stem from differences in the languages used to write the applications, differences in the target operating systems of the applications, differences in the applications' underlying communication protocols, and other similar issues. Multiple incompatibilities may exist between two applications or objects. An adapter is programmed with the necessary information to understand each object and pass information between them. Many different adapters may be required for complex environments where multiple, incompatible applications and/or objects are attempting to communicate. In one embodiment, XML based adapters allow cross-protocol and cross-language communication.

Figure 9:
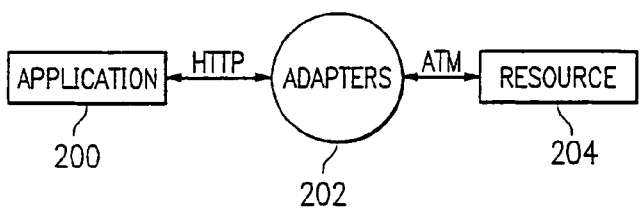
FIG. 9 is a block diagram demonstrating a service performing a cross-protocol transformation.

Referring to FIG. 9, an application 200 uses HTTP to communicate. The application 200 requires access to a resource 204 which communicates using the ATM protocol. One or more adapters 202 are used to facilitate communication between the application and the resource because they cannot directly communicate due to differences in the two protocols.

In operation, an HTTP request is received by an adapter. An HTTP adapter converts the request into an XML-based event, which is published to an event system, such as the event system 56 of FIG. 4. An ATM adapter receives the event and converts the request to corresponding ATM requests. The ATM response is converted into the appropriate response to the event. Finally, the HTTP adapter converts the event response into the appropriate HTTP response.

An advantage of this embodiment is that the adapters use XML as the intermediate format of requests and responses. Standard XML functionality, such as eXtensible Stylesheet Language Transformations ("XSLT"), can be employed to aid with the conversion between incompatible protocols or applications.

Another advantage of this embodiment is that multiple dynamically loaded adapters can be employed to full a request using an event system. The choice of which adapters are used can be programmed or negotiated between applications based on the availability of required adapters.

Yet another advantage of this embodiment is that the activity of the adapters can be monitored, extended, and enhanced by the addition of additional services which subscribe the events.

Preprocessing

The XIS framework utilizes a preprocessing stage in which the preprocessing is based on an XML definition. During this preprocessing stage, the code for any required bridges is generated. As previously explained in greater detail in the bridging section, the preprocessing stage will parse an XML configuration file, which contains information such as the languages and protocols used. The preprocessing stage will then generate the required bridges based on the XML configuration file.

Memory Manager

Memory managers care for the memory needs of an application. They accomplish this by receiving memory requests from the application and then requesting that the operating system allocate sufficient memory to satisfy the request. In addition, memory managers inform the operating system that previously allocated memory is no longer needed by the application, allowing the operating system to deallocate the memory and return it to the available memory pool.

The memory manager for the present embodiment features two improvements over existing memory managers. The first improvement enables the memory manager to manage per thread memory pools. This removes much of the allocation/deallocation burden from the operating system and allows it to process more important tasks. The second improvement allows the memory manager to determine whether memory is being shared with a different thread. This allows it to control the communication mechanism for appending to a free list.

Figure 10:
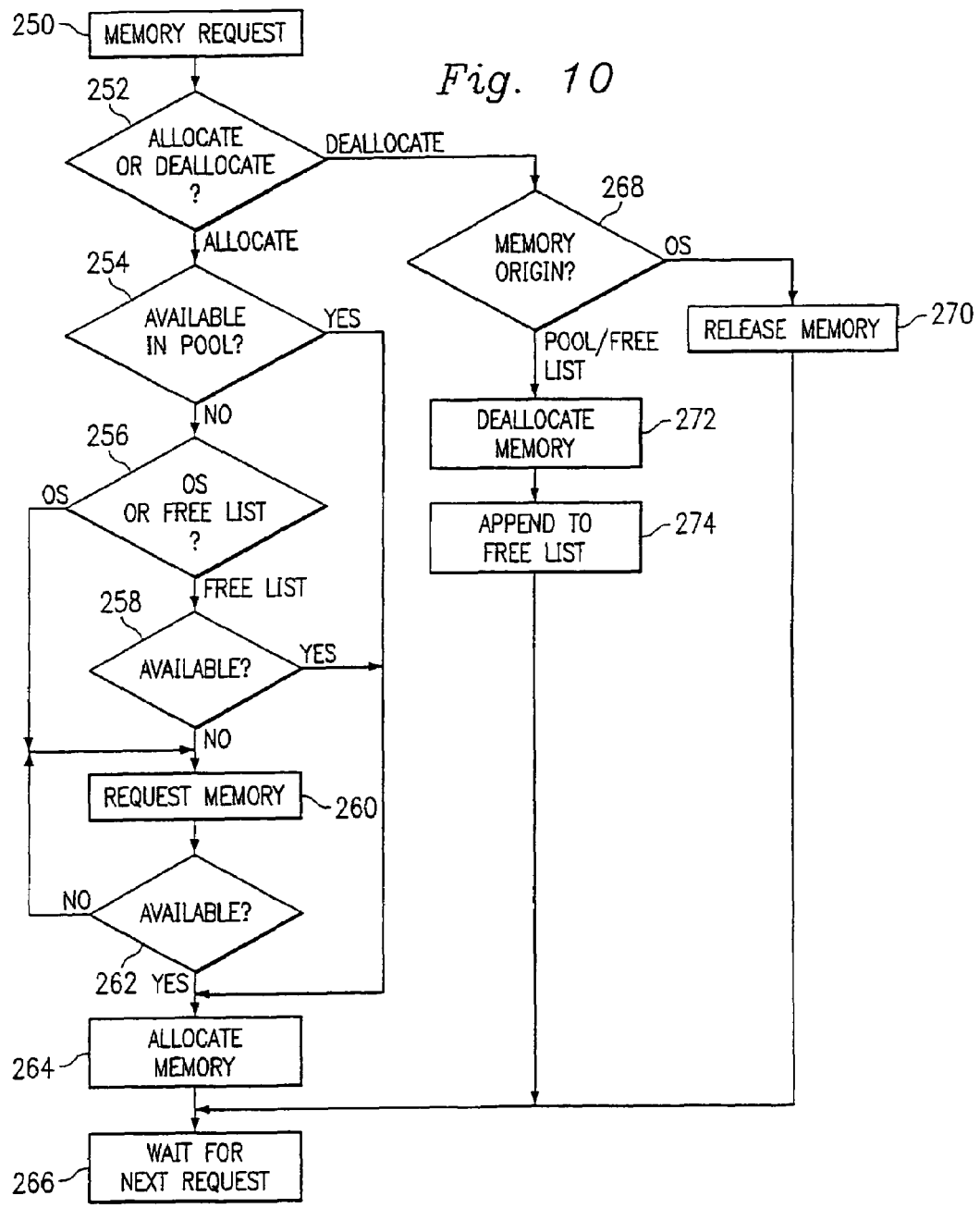
FIG. 10 is one embodiment of a memory management scheme.

Referring now to FIG. 10, each thread is allocated a memory pool which is controlled by a memory manager. A thread which requires additional memory sends a memory allocation request to the memory manager in step 250. In step 252, the memory manager accepts the request and determines whether it is an allocation or deallocation request. If the request is for allocation, the memory manager continues to step 254 where it determines whether if the thread requires an amount of memory that can be provided by its memory pool. If so, the memory manager allocates the memory directly from the pool in 264.

However, if the memory manager determines that the memory pool for the thread does not contain sufficient free memory to fill the allocation request, the memory manager may decide in step 256 to either allocate memory from another thread's memory pool to the requesting thread or request additional memory from the operating system. If the memory manager decides to allocate memory from the free list, it moves to step 258 and determines whether enough memory is available from the free list. If sufficient memory is available, the memory manager allocates the required memory to the requesting thread in step 264. It then continues to step 266, where it waits for the next memory request.

If the free list has insufficient available memory, the memory manager moves to step 260, where it requests memory from the operating system. Note that this is the same step as would occur if the memory manager decided to request memory from the operating system instead of the free list in step 256. In step 262, the memory manager receives a message from the operating system regarding the availability of the requested memory. If the operating system can provide the memory, the memory manager receives the allocation and allocates the memory to the thread in step 264. If the operating system cannot provide the memory, the memory manager enters a wait state until the memory becomes available. It then continues to step 264, where it allocates the memory before proceeding to step 266, where it waits for the next memory request.

If the memory request 250 is determined to be for deallocation in step 252, the memory manager moves to step 268. In step 268, the memory manager determines whether the memory was allocated from the thread's pool, from the free list, or from the operating system. Determining the origin of the allocated memory may be as simple as comparing the memory locations being deallocated with those allocated to the threads or it may require more advanced memory management techniques. If the memory being deallocated was originally allocated by the operating system, the memory manager moves to step 270 where it simply releases the memory. If the memory manager allocated the memory from the thread's pool or the free list, the memory manager deallocates the memory in step 272 and appends it to the free list for future memory requests in step 274. Regardless of the origin of the memory allocation, the memory manager returns to step 266 after completing the deallocation to wait for the next request.

Caching

Caching is a process which stores data in memory locations called caches in order to improve data access times. The cache memory is generally faster than regular memory and, therefore, decreases the time required for both data storage and retrieval. Caches may be either temporary or permanent, depending on the type of memory used and the purpose of the cache.

One embodiment provides for caching through the object factory. The object factory assigns object IDs to each object. The object factory then retrieves the correct object when it receives a request for a given ID.

Style Sheet Selection

The present embodiment implements style sheet selection algorithms which use a multi-layered inheritance scheme. This multi-layered inheritance scheme allows inheritance to be determined from different directions and allows style sheet selection to be very specifically tailored. This scheme uses a combination of browser type, service and class identifications ("IDs") to select the style sheet.

Figure 11:
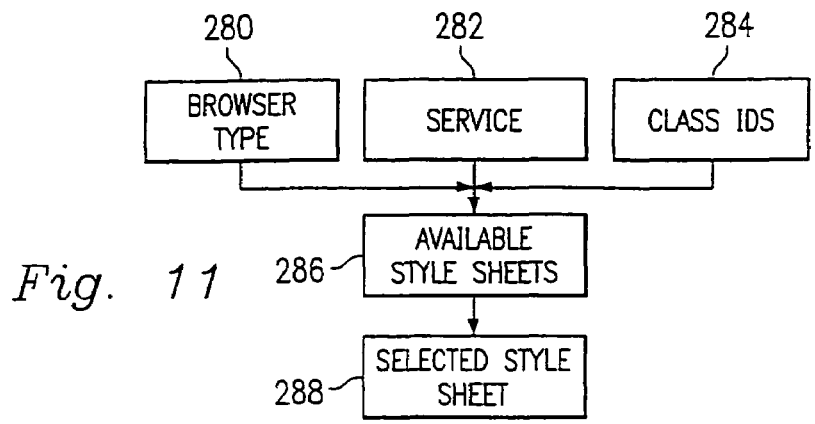
FIG. 11 is a flowchart demonstrating a basic style sheet selection sequence.

Referring to FIG. 11, the style sheet selection sequence looks for inheritance from the browser type 280, the service 282, and the applicable class IDs 284. The selection process then continues to 286, where it determines the appropriate style sheet 288 from those available.

Cross-Protocol Querying

The XIS framework enables the implementation of an extremely comprehensive, cross-protocol query method. This query method operates by taking a single query, applying it across multiple protocols, and then combining the results received from the protocols as a single result set.

Figure 12:
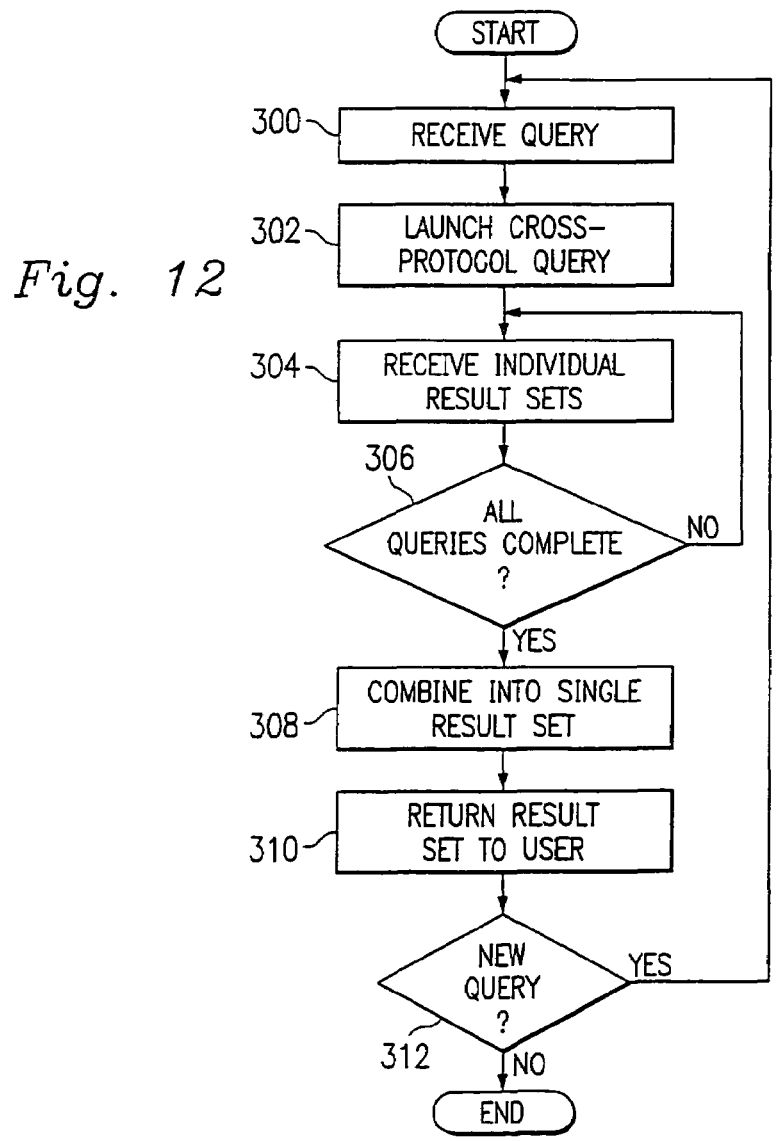
FIG. 12 is a flowchart illustrating a cross-protocol query method.

Referring now to FIG. 12, for example, a user launches a query 300 for a term such as "NetWare Loadable Module." The query method has been configured to search through all available protocols in step 302, which for this example includes the Lightweight Directory Access Protocol ("LDAP"), Web-based Distributed Authoring and Versioning ("WebDAV"), Network News Transfer Protocol ("NNTP") and HTTP.

The query sequence receives individual result sets from each of the protocols in 304 and ensures that it has received a result set in 306 from every protocol. If not all protocol result sets have been returned, the sequence moves back to 304 until each protocol returns its result set. Alternatively, the query sequence may wait for a predetermined amount of time, after which it times out and exits the wait state even if one or more protocols have not yet returned a result set.

When all the result sets have been received, they are combined into a single result set in step 308. The combined result set is then returned to the user in 310. The query sequence then determines whether a new query has been made in 312. If a new query has been issued by a user, the sequence returns to step 300. If no new query has been received, the sequence ends.

XML Store

The XIS framework of the present embodiment requires a process to store and retrieve XML information. The framework accomplishes this through an XML store, which utilizes mapping methods to map between a database scheme and XML so that the XML aspect is retained. The database scheme includes relevant information regarding the methodology for such aspects as indexing and structuring the contents of the database.

URI Mapping

The URI system provides a standardized addressing scheme. In one embodiment, URI mapping permits the integration of a wide variety of services and actions within the XIS framework. In addition, URI mapping provides for the triggering of services and actions which drives the event system.

Replication

In one embodiment, the XIS framework permits the generic replication of XML data to another machine. Such replication details and controls how objects are retrieved, how events are replicated up to the master processes, and other fundamental replication issues. One embodiment of such a replicatory scheme is provided in U.S. patent application Ser. No. 09/501,873, filed on Feb. 10, 2000, and also assigned to Novell, Inc., entitled "VIRTUAL REPLICATION FOR A COMPUTER DIRECTORY SYSTEM", now U.S. Pat. No. 6,671,688, issued Dec. 30, 2003, and hereby incorporated by reference as if reproduced in its entirety.

It is further understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

We claim:

1. A method for providing an event system in a distributed directory-enabled application environment using an eXtensible Markup Language ("XML") application program interface ("API"), the interface including at least one event delineated by an event parameter, the event defining an object delineated by an object property and an object parameter, the method comprising:
   accepting one or more applications as subscribers to the event;
   defining one or more subscription filters for each of the subscribers, thereby allowing the subscribers to selectively filter the event;
   publishing the event;
   retrieving a subscriber list, the list including the one or more subscribers and the one or more subscription filters; and
   automatically and sequentially passing the event to each subscriber on the list having associated filters that allow the event to pass and allowing such subscribers to act on the event until the subscriber list is exhausted or the event terminated.

2. The method of claim 1 further including filtering the event through an event filter based on the event parameter.

3. The method of claim 2 further including acting on the event by altering the event parameter, so that the event is transformed through the alteration.

4. The method of claim 1 further including filtering the event through an object filter, whereby the event is filtered based on the object property.

5. The method of claim 4 further including acting on the event by altering the object property, so that the event is transformed through the alteration.

6. The method of claim 1 further including filtering the event through a parameter filter, whereby the event is filtered based on the object parameter.

7. The method of claim 6 further including acting on the event by altering the object parameter, so that the event is transformed through the alteration.

8. The method of claim 1 further including acting on the event by terminating the event, so that the event is stopped by the termination.

9. The method of claim 1 further including tracking the event, whereby information about the event may be gathered.

10. The method of claim 9 further including generating reports from the gathered information, so that the information about the event may be compiled.

11. A computer system for providing an event system in a distributed directory-enabled application environment using an eXtensible Markup Language ("XML") application program interface ("API"), the interface including at least one event delineated by an event parameter, the event defining an object delineated by an object property and an object parameter, the system comprising:
   at least one processor;
   at least one memory accessible to the processor;
   a plurality of applications stored in a plurality of respective portions of the memory;
   defining at least one subscription filter allowing a plurality of subscribers to selectively filter the event;
   parsing the event with an XML parser;
   instantiating the event as a Data Object Model (DOM) class when services required by the event are unavailable;
   publishing the event by at least one of the plurality applications;
   automatically passing the event to at least one of the plurality of applications if the event passes the at least one subscription filter; and
   allowing at least one of the plurality of applications to act on the event.

12. The computer system of claim 11 further including instructions for filtering the event through an event filter, whereby the event is filtered based on the event parameter.

13. The computer system of claim 12 further including instructions for acting on the event by altering the event parameter, so that the event is transformed through the alteration.

14. The computer system of claim 11 further including instructions for filtering the event through an object filter, whereby the event is filtered based on the object property.

15. The computer system of claim 14 further including instructions for acting on the event by altering the object property, so that the event is transformed through the alteration.

16. The computer system of claim 11 further including instructions for filtering the event through a parameter filter, whereby the event is filtered based on the object parameter.

17. The computer system of claim 16 further including instructions for acting on the event by altering the object parameter, so that the event is transformed through the alteration.

18. The computer system of claim 11 further including instructions for acting on the event by terminating the event, so that the event is stopped by the termination.

19. The computer system of claim 11 further including instructions for tracking the event, whereby information about the event may be gathered.

20. The computer system of claim 19 further including instructions for generating reports from the gathered information, so that the information about the event may be compiled.

21. A method for providing an event system in a distributed directory-enabled application environment using an eXtensible Markup Language ("XML") application program interface, the interface including at least one event delineated by an event parameter, the event defining an object delineated by an object property and an object parameter, the method comprising:
   defining at least one subscription filter allowing at least first and second subscribers to selectively filter the event;
   publishing the event;
   retrieving a subscriber list, the list including the first and second subscribers and the subscription filter;
   selecting the first and second subscribers and the subscription filter from the list;
   passing the event to the first subscriber if the event passes through a first subscription filter;
   allowing the first subscriber to modify or terminate the event based on an alteration of at least one of the event parameter and the object parameter; and
   passing the modified event to the second subscriber if the event is not terminated and the event passes through a second subscription filter.

* * * * *